United States Patent
Patera et al.

(10) Patent No.: US 9,320,993 B2
(45) Date of Patent: Apr. 26, 2016

(54) FILTER HOUSING FOR SMALL MEDIA

(71) Applicant: Whirlpool Corporation, Benton Harbor, MI (US)

(72) Inventors: Ginger Elayne Patera, St. Joseph, MI (US); Steven John Kuehl, Stevensville, MI (US); David P. Cooper, Kalamazoo, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 594 days.

(21) Appl. No.: 13/674,313

(22) Filed: Nov. 12, 2012

(65) Prior Publication Data

US 2014/0131290 A1    May 15, 2014

(51) Int. Cl.
*B01D 27/08*    (2006.01)
*B01D 35/30*    (2006.01)
*F25D 23/12*    (2006.01)

(52) U.S. Cl.
CPC .............. *B01D 35/30* (2013.01); *B01D 27/08* (2013.01); *B01D 2201/0415* (2013.01); *B01D 2201/302* (2013.01); *F25D 23/126* (2013.01); *F25D 2323/121* (2013.01)

(58) Field of Classification Search
CPC ...... B01D 24/00; B01D 24/007; B01D 24/10; B01D 24/14; B01D 27/08; B01D 27/14; B01D 35/30; B01D 35/301; B01D 37/00; B01D 37/02; B01D 37/025; B01D 2201/30; B01D 2201/302; B01D 2201/305; B01D 2201/306; B01D 2201/31; B01D 2201/40; B01D 2201/4023; B01D 2201/4046; B01D 2201/4053; B01D 2201/4061; B01D 2201/52; B01D 2201/56; B01D 2201/4015; B01D 29/13; B01D 29/15; B01D 29/23; B01D 35/02; B01D 2201/04; B01D 2201/0415; B01D 2201/0423; C02F 1/00; C02F 1/003; C02F 5/08; C02F 9/00; C02F 2307/10; C02F 2201/003; C02F 2201/004; C02F 2201/006; C02F 2209/40; C02F 2301/026; C02F 2301/08; C02F 1/001; C02F 2201/002; C02F 2307/12; F25D 23/126; F25D 23/121

USPC .............. 55/490, 492, 495, 501, 502; 210/91, 210/232, 435, 440, 443, 445, 450, 455, 483

See application file for complete search history.

(56) References Cited

U.S. PATENT DOCUMENTS 630,870 A    8/1899   Driesbach
773,946 A    11/1904  Langill (Continued)

FOREIGN PATENT DOCUMENTS

CN    201906509 U    7/2011
DE    3700372 C1    12/1987

(Continued)

OTHER PUBLICATIONS

European Patent Application No. 13191965.6 filed Nov. 7, 2013, Applicant: Whirlpool Europe S.r.l, European extended search report mail date Jan. 17, 2014.

(Continued)

*Primary Examiner* — Joseph Drodge

(57) ABSTRACT

A fluid treatment apparatus includes a base portion, a medium or media, and an elongated support portion. The base portion has a first end, a second end, and a side with an exterior surface. The first end has an inlet and outlet for receiving and dispensing a water flow, respectively. The medium or media is spaced within the base portion and receives fluid through the inlet, treats the fluid, and dispenses the fluid through the outlet. The elongated support portion extends from the second end of the base portion and has a sidewall. The sidewall has an exterior facing surface that is substantially aligned with the exterior surface of the side. The elongated support portion maintains a latch assembly location for engaging a filter head assembly and is configured to withstand torsional forces applied by the user for engagement and alignment with an elongated receiving cavity of an appliance.

18 Claims, 11 Drawing Sheets

(56) References Cited

U.S. PATENT DOCUMENTS

| | | | |
|---|---|---|---|
| 1,259,498 A | 3/1918 | Elmore | |
| 3,714,292 A | 6/1974 | Dargols | |
| 3,891,555 A | 6/1975 | Bennett et al. | |
| 4,207,994 A | 6/1980 | Offlee | |
| 4,757,921 A | 7/1988 | Snowball | |
| 4,792,059 A | 12/1988 | Kerner | |
| 4,808,303 A | 2/1989 | Edwards et al. | |
| 4,828,698 A | 5/1989 | Jewell et al. | |
| 4,909,937 A | 3/1990 | Hoffmann et al. | |
| 5,160,038 A | 11/1992 | Harada et al. | |
| 5,273,649 A | 12/1993 | Magnusson | |
| 5,586,439 A | 12/1996 | Schlosser et al. | |
| 5,635,063 A | 6/1997 | Rajan et al. | |
| 5,715,699 A | 2/1998 | Coates et al. | |
| 5,826,854 A | 10/1998 | Janvrin et al. | |
| 6,080,313 A | 6/2000 | Kelada | |
| 6,099,735 A | 8/2000 | Kelada | |
| 6,101,835 A | 8/2000 | Butsch et al. | |
| 6,572,769 B2 | 6/2003 | Rajan et al. | |
| 6,675,593 B1 | 1/2004 | Suydam | |
| 6,800,200 B2 | 10/2004 | Bassett et al. | |
| 7,000,894 B2 | 2/2006 | Olson et al. | |
| 7,043,150 B2 | 5/2006 | Krause et al. | |
| 7,047,754 B2 | 5/2006 | An et al. | |
| 7,081,201 B2 | 7/2006 | Bassett et al. | |
| 7,125,434 B2 | 10/2006 | Yavorsky et al. | |
| 7,130,533 B2 | 10/2006 | Kim et al. | |
| 7,137,272 B2 | 11/2006 | Park et al. | |
| 7,163,625 B1 | 1/2007 | Williamson et al. | |
| 7,207,189 B2 | 4/2007 | An et al. | |
| 7,252,757 B2 * | 8/2007 | Warren et al. | 210/87 |
| 7,276,161 B2 | 10/2007 | Rajan et al. | |
| 7,413,663 B2 | 8/2008 | Rajan et al. | |
| 7,610,849 B2 | 11/2009 | Bigge et al. | |
| 7,610,932 B2 | 11/2009 | Olson et al. | |
| 7,614,508 B2 | 11/2009 | Mitchell et al. | |
| 7,640,766 B2 | 1/2010 | Shelton | |
| 7,748,570 B2 | 7/2010 | Bordino | |
| 7,814,769 B2 | 10/2010 | Kim et al. | |
| 7,823,407 B2 | 11/2010 | Lim et al. | |
| 7,985,343 B2 | 7/2011 | Haldopoulos et al. | |
| 8,001,801 B2 * | 8/2011 | Coleman | 62/318 |
| 8,216,463 B1 * | 7/2012 | Baird | B01D 35/30 210/232 |
| 9,109,721 B1 * | 8/2015 | Williams | F16K 51/00 |
| 2002/0110482 A1 | 8/2002 | Lawton | |
| 2002/0166805 A1 * | 11/2002 | Minns et al. | 210/232 |
| 2003/0034285 A1 | 2/2003 | Hembree | |
| 2004/0129617 A1 | 7/2004 | Tanner et al. | |
| 2004/0129627 A1 * | 7/2004 | McGibbon | 210/433.1 |
| 2004/0211717 A1 | 10/2004 | Mitchell et al. | |
| 2005/0089458 A1 | 4/2005 | Oke | |
| 2006/0049096 A1 | 3/2006 | Bassett | |
| 2006/0144066 A1 | 7/2006 | Lee et al. | |
| 2007/0084772 A1 | 4/2007 | Holler | |
| 2007/0241045 A1 | 10/2007 | Kott | |
| 2007/0251261 A1 | 11/2007 | Son et al. | |
| 2007/0272620 A1 | 11/2007 | Chaney | |
| 2008/0035552 A1 | 2/2008 | Lee | |
| 2009/0008318 A1 | 1/2009 | Anes et al. | |
| 2009/0045106 A1 | 2/2009 | Kuennen et al. | |
| 2009/0077992 A1 | 3/2009 | Anderson | |
| 2009/0173675 A1 | 7/2009 | Scholz | |
| 2009/0217694 A1 | 9/2009 | Kim | |
| 2009/0236272 A1 * | 9/2009 | Zerger | C02F 9/005 210/137 |
| 2009/0249821 A1 | 10/2009 | Zentner | |
| 2009/0293735 A1 | 12/2009 | Van Dillen et al. | |
| 2009/0314703 A1 | 12/2009 | Beach | |
| 2010/0018238 A1 * | 1/2010 | Gerner et al. | 62/318 |
| 2010/0059455 A1 | 3/2010 | Hsueh et al. | |
| 2010/0175415 A1 | 7/2010 | Kim | |
| 2010/0219131 A1 | 9/2010 | Levy | |
| 2010/0221394 A1 | 9/2010 | Gaulard | |
| 2010/0243581 A1 | 9/2010 | Williams | |
| 2011/0006009 A1 | 1/2011 | Hamlin et al. | |
| 2011/0068053 A1 | 3/2011 | Kim et al. | |
| 2011/0185762 A1 | 8/2011 | Kruckenberg et al. | |
| 2011/0198301 A1 | 8/2011 | Haldopoulos et al. | |
| 2011/0278242 A1 | 11/2011 | Levy | |
| 2011/0278243 A1 | 11/2011 | Levy | |
| 2012/0017766 A1 * | 1/2012 | Anson | B65D 47/12 99/290 |
| 2012/0144854 A1 * | 6/2012 | Huda et al. | 62/318 |
| 2012/0261322 A1 * | 10/2012 | Yang | C02F 1/002 210/232 |
| 2012/0263801 A1 * | 10/2012 | Code et al. | 424/637 |

FOREIGN PATENT DOCUMENTS

| | | |
|---|---|---|
| DE | 202008007246 U1 | 11/2008 |
| JP | 63175685 A | 7/1988 |
| JP | 4227009 A | 8/1992 |
| WO | 0236248 A1 | 5/2002 |
| WO | 2008062948 A1 | 5/2008 |

OTHER PUBLICATIONS

European Patent Application No. 13191729.6 filed Nov. 6, 2013, Applicant: Whirlpool Europe S.r.l, European extended search report mail date Feb. 13, 2014.

European Patent Application No. 13192204.9 filed Nov. 8, 2013, Applicant: Whirlpool Europe S.r.l, European extended search report mail date Feb. 13, 2014.

European Patent Application No. 13191798.1 filed Nov. 6, 2013, Applicant: Whirlpool Europe S.r.l, European extended search report mail date Feb. 13, 2014.

* cited by examiner

FILTER HOUSING FOR SMALL MEDIA

CROSS REFERENCE TO RELATED APPLICATIONS

This application is related to and hereby incorporates by reference the entirety of the following patent applications filed on even date herewith: Ser. No. 13/674,300, entitled CUSTOMIZABLE MULTI-STAGE WATER TREATMENT ASSEMBLY; Ser. No. 13/674,289, entitled MULTI-STAGE FLUID FILTER ASSEMBLY WITH FILTRATION MEMBRANE; Ser. No. 13/674,276, entitled MULTI-STAGE FLUID FILTER ASSEMBLY WITH FILTRATION MEMBRANE; and Ser. No. 13/674,266, entitled CONSUMABLE DESCALING CARTRIDGES FOR A REFRIGERATOR APPLIANCE.

FIELD OF THE INVENTION

The present invention generally relates to water filters for appliances typically domestic refrigerators, refrigerators and freezers, freezers, or ice making devices, and more specifically relates to a water filter housing apparatus adapted to engage to an interior of a cavity of an appliance.

BACKGROUND OF THE INVENTION

Water filters have become common fixtures in appliances adapted to dispense water or ice, or produce ice. These filters are provided in appliances to filter municipal water, well water, or other water sources in order to improve water quality for human consumption. A variety of attachment mechanisms and arrangements are used to engage a water filter to an appliance. Generally, appliances are adapted to receive a single filter design used upon the attachment mechanism or arrangement used, and the filters, have one predetermined, fixed size and filtering capacity and are entirely disposed as waste when used. Typically, current water filters are lengthy substantially cylindrically shaped structure. They are shaped this way to allow for greater capacity and useful life and to allow for their engagement to the appliance by a user at a generally rearward location. As a result, the engagement mechanism on the appliance is generally recessed or only accessible when a user grasps the end distal from the water filter's appliance engaging end and inserts it into a filter receiving/engaging cavity in the appliance. The water filter is thereafter typically twisted/rotated about its elongated axis to engage the filter with the appliance. There are certain filter designs employing one or more protrusions along the length of the generally cylindrical shaped filter that function to operate a switch within the appliance to indicate the presence of a filter, its capacity, or other information to the appliance when the filter is engaged to the appliance.

BRIEF SUMMARY OF THE INVENTION

According to one aspect of the present invention, a fluid treatment apparatus having a longitudinal length includes a base portion with a length one half the longitudinal length of the fluid treatment apparatus, or less. The base portion has a first end, a second end, and at least one side extending between the first end and the second end. The side has an exterior surface and an interior surface, wherein together with the first end and second end defines fluid treatment media receiving volume within the base portion. The first end of the base portion has an inlet and an outlet for receiving and dispensing a fluid, respectively, to and from the fluid treatment media receiving volume. A medium or media is spaced within the fluid treatment receiving volume for treating fluid that contacts the medium or media. An elongated support portion engages the base portion, wherein the length of the elongated support portion is one half the longitudinal length of the fluid treatment apparatus, or more. The elongated support portion has a cap and a sidewall extending longitudinally between the second end of the base portion and the cap. The sidewall has an exterior facing surface that is an extension of and is at least substantially aligned with the exterior surface of the side of the base portion.

According to another aspect of the present invention, a water treatment apparatus, having a longitudinal length that engages an appliance and receives water to be treated by the water treatment apparatus from the appliance. The water treatment apparatus includes a cylindrical shaped base portion with a length one half the longitudinal length of the water treatment apparatus, or less. The base portion has a first end, a second end, and a tubular shaped side with an exterior surface and an interior surface. The tubular shaped side extends between the first and second end defining an interior water receiving volume within the base portion. The first end of the base portion has an inlet and outlet for receiving and dispensing water, respectively. A medium or media is spaced within the water receiving volume, wherein the medium or media engages water that is received through the inlet and into the water receiving volume. The medium or media treats the water contacting it to form treated water that is dispensed through the outlet. An elongated support portion, has a sidewall extending from the second end to the base portion, wherein the sidewall has an exterior facing surface that is aligned with or substantially aligned with the exterior surface of the tubular side of the base portion. The elongated support portion is devoid of any medium or media and does not contact the water received by the inlet.

According to a further aspect of the present invention, a method is defined for treating a fluid using a fluid treatment apparatus fluidly connected with an appliance. The method includes exposing a fluid treatment apparatus receiving cavity on a filter head assembly of the appliance to allow for removal or insertion of a fluid treatment apparatus. Another step includes grasping a fluid treatment apparatus having a longitudinal length, wherein the fluid treatment apparatus is the embodiment described above. A further step includes inserting the fluid treatment apparatus and aligning it in a connecting position with a filter head assembly, wherein the base portion of the fluid treatment apparatus is manipulated and aligned by rotating the cap or the sidewall. Also included in the method is engaging a latch assembly that extends from the exterior facing surface of the sidewall with the filter head assembly. Another step includes engaging the fluid treatment apparatus with the water supply port and a water delivery port of the filter head assembly by rotating the cap or the sidewall of the fluid treatment apparatus. This rotation opens a bypass valve in the head assembly or the filter head assembly thereby supplying a water flow from the appliance through the inlet and into the medium or media, wherein the water is treated and thereafter dispensed through the outlet back into the appliance.

By longitudinally extending an elongated support portion from a base portion containing a medium or media, a fluid treatment apparatus can engage an appliance's filter head assembly that may generally be adapted to receive a single elongated filter. A medium or media providing a reduced capacity can be manufactured for a variety of customizable usages that the appliance's predetermined filter cannot accommodate. The elongated support portion is typically configured to avoid using excess materials (plastic) in the construction of the fluid treatment apparatus, while maintaining a latch assembly location in the required torsional strength needed to allow the user to manipulate and rotate the fluid treatment apparatus into a connecting position within the filter head assembly.

These and other aspects, objects, and features of the present invention will be further understood and appreciated by those skilled in the art upon studying the following specification, claims, and appended drawings.

DETAILED DESCRIPTION

Figure 1:
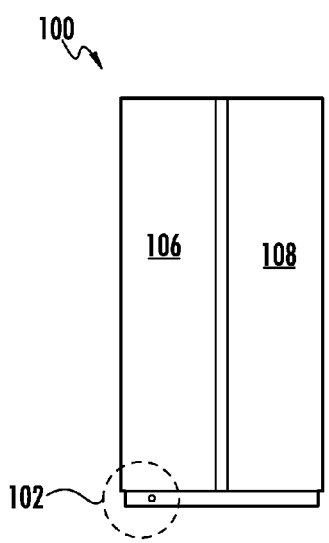
FIG. 1 is a front view of a refrigerator and freezer appliance and showing a general location where a fluid treatment apparatus of the present invention may be operably connected to the appliance.

For purposes of description herein, the terms "upper," "lower," "right," "left," "rear," "front," "vertical," "horizontal," and derivates thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the amended claims, the singular forms "a," "an," and "the" include plural reference unless the context clearly dictates otherwise.

Figure 2:
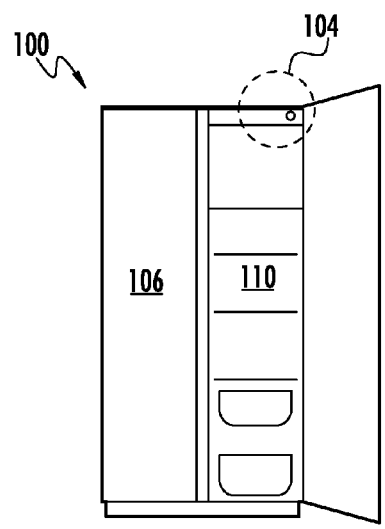
FIG. 2 is a front view of a refrigerator and freezer appliance having a refrigerator door open and showing a general location where a fluid treatment apparatus of the present invention may be operably connected to the appliance.
Figure 3:
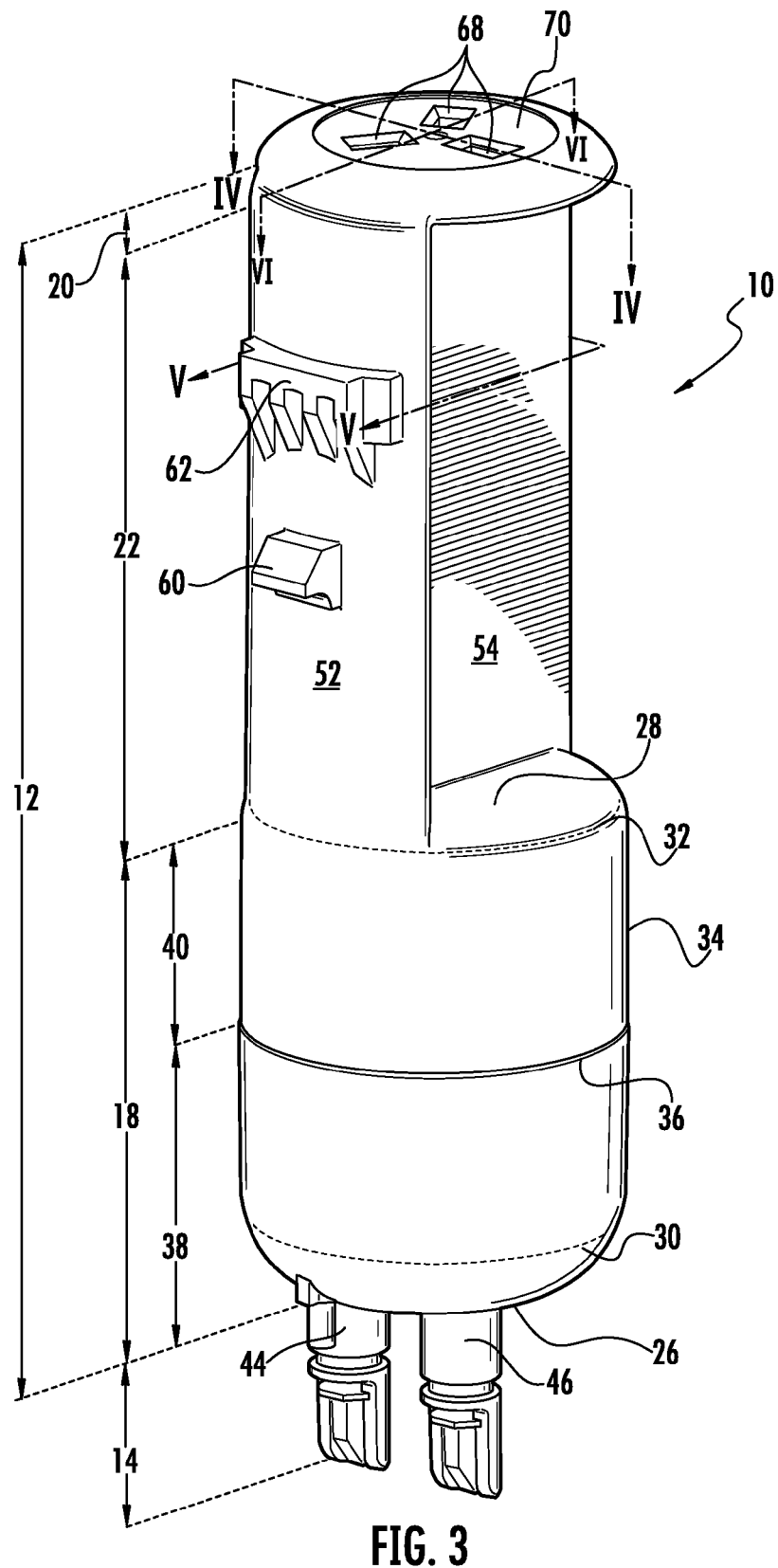
FIG. 3 is a perspective side view of a fluid treatment apparatus.
Figure 10:
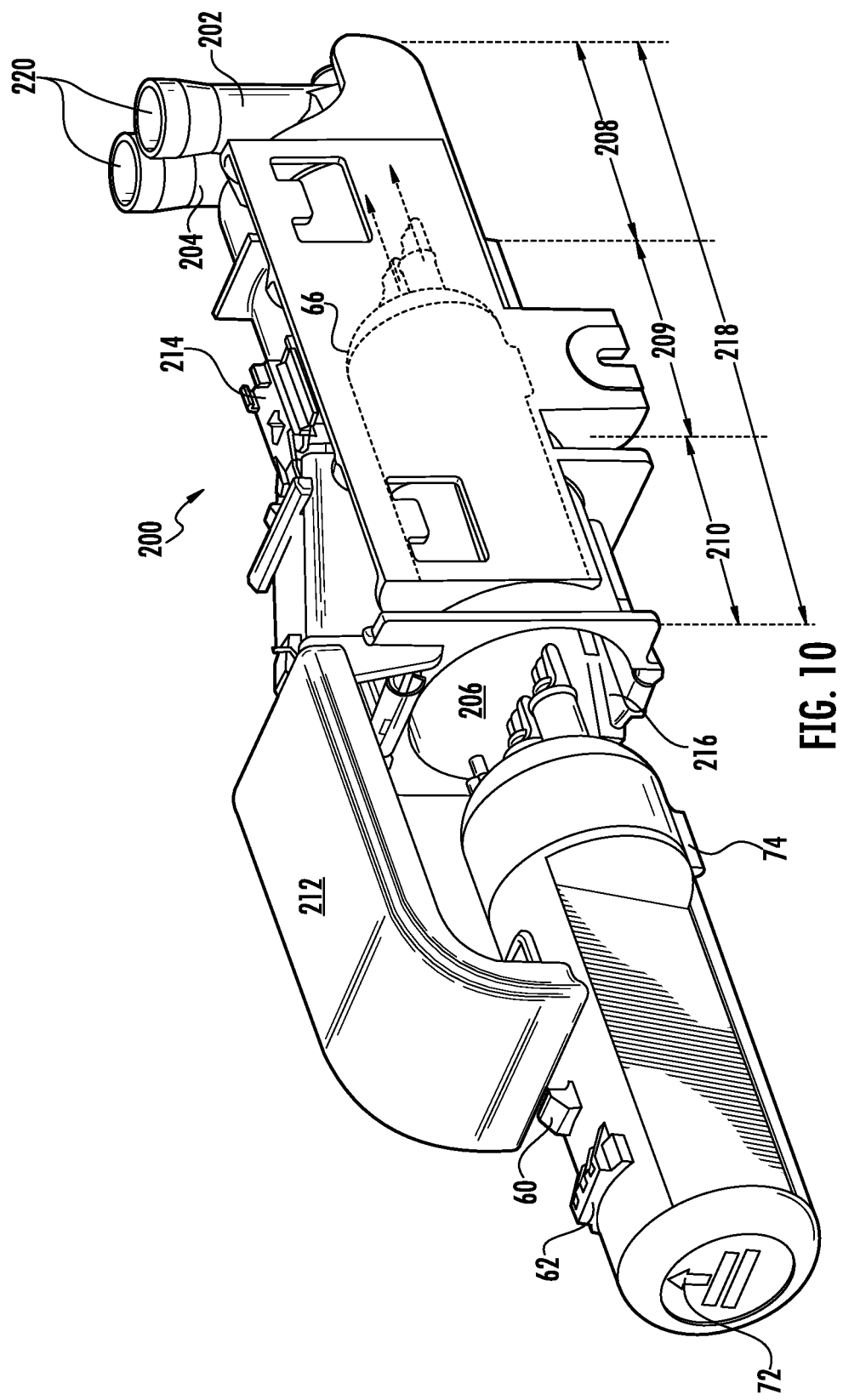
FIG. 10 is a perspective side view of a fluid treatment apparatus according to an embodiment of the present invention being inserted into an interior of a cavity of an appliance filter head assembly.

As illustrated in FIG. 3, a fluid treatment apparatus 10 is generally installed and removably engaged with a domestic refrigerator appliance 100 (FIGS. 1 and 2), but may also be used in other appliances that store, use, or dispense ice, water, or other liquid to be filtered and/or treated. More specifically, the fluid treatment apparatus 10 is typically designed to engage the appliance 100, typically via a filter head assembly 200 (FIG. 10) in either the lower grille portion 102 (FIG. 1) or the upper panel portion 104 (FIG. 2) of a domestic refrigerator. In the illustrated embodiments, a side-by-side domestic refrigerator is shown having a freezer section 106 on the left side and a refrigerator section (fresh food compartment) 108 on the right side. The interior portion 110 of the refrigerator section typically has an upper panel portion 104 extending across the top portion of the section. Generally, a fluid treatment apparatus 10 that is located on the interior portion 110 of an appliance 100 is located in the refrigerator section to avoid freezing temperatures. In particular, the upper panel portion 104 in a refrigerator section 108 provides a suitable location for a fluid treatment apparatus, as this location is also frequently occupied by temperature controls or other user interfaces, or displays. A drop down, push button activated access door in the ceiling of the appliance 100 may also be opened and the fluid treatment apparatus 10 inserted and engaged to the appliance 100 through such an access door. The lower grille portion 102 of a domestic refrigerator appliance 100 is also a suitable location for a fluid treatment apparatus, as such a location typically provides close proximity to a water source connection leading to the appliance, has an above-freezing temperature, and is near other electrical components and devices, such a the compressor. Additionally, other suitable locations that allow water egress and ingress are conceivable on domestic refrigerators, refrigerators and freezers, freezers, ice makers, and other related appliances.

Figure 4:
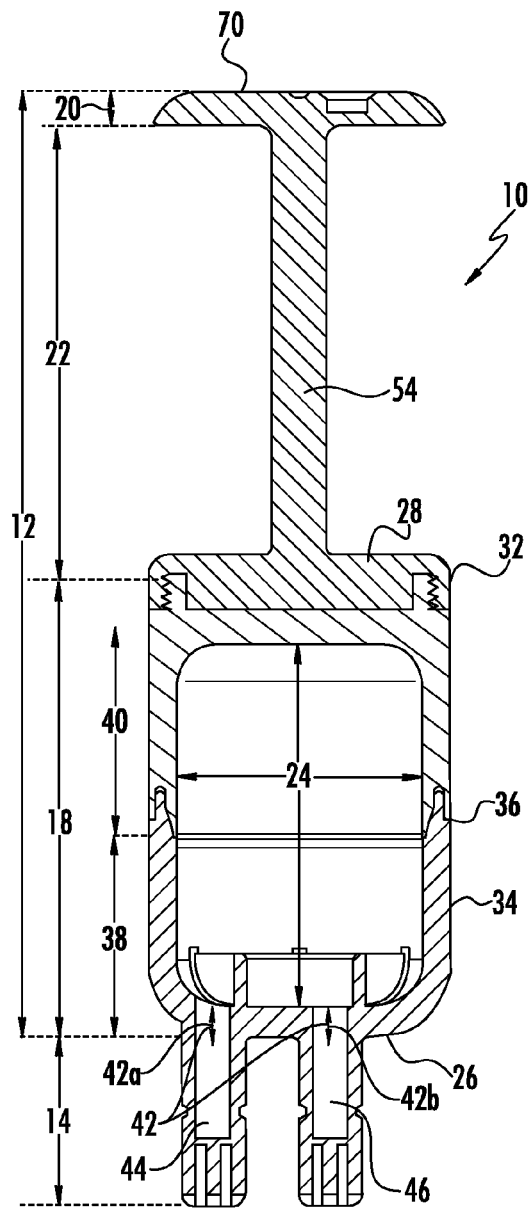
FIG. 4 is a side cross-sectional view of a fluid treatment apparatus according to an embodiment of the present invention taken along plane IV-IV of FIG. 3.
Figure 5:
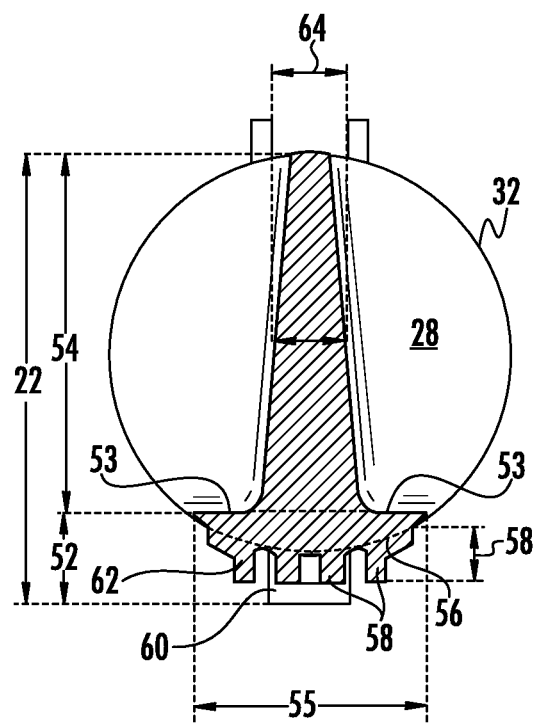
FIG. 5 is a top cross-sectional view of an elongated support portion of the fluid treatment apparatus according to an embodiment of the present invention taken along plane V-V of FIG. 3.
Figure 6:
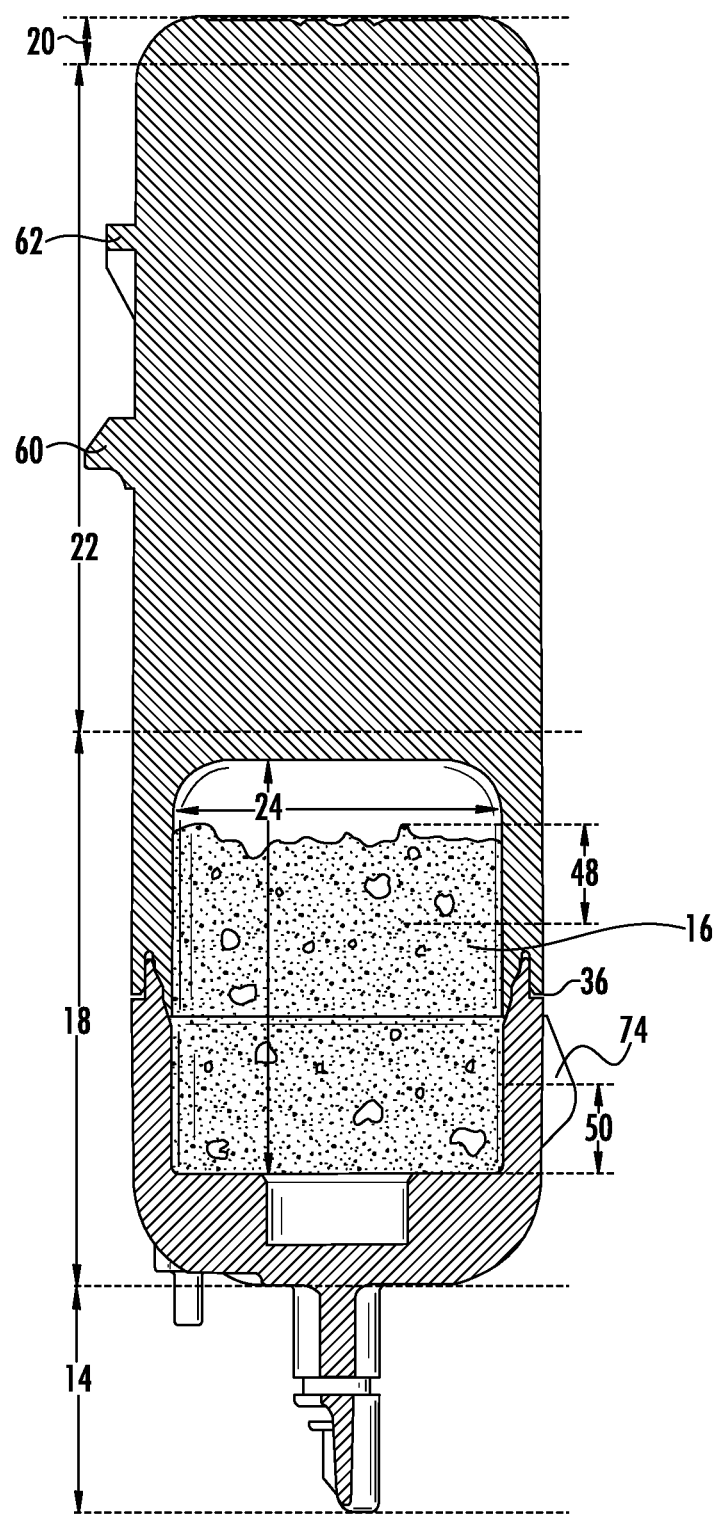
FIG. 6 is an alternative side cross-sectional view of a fluid treatment apparatus according to an embodiment of the present invention taken along plane VI-VI of FIG. 3.
Figure 7:
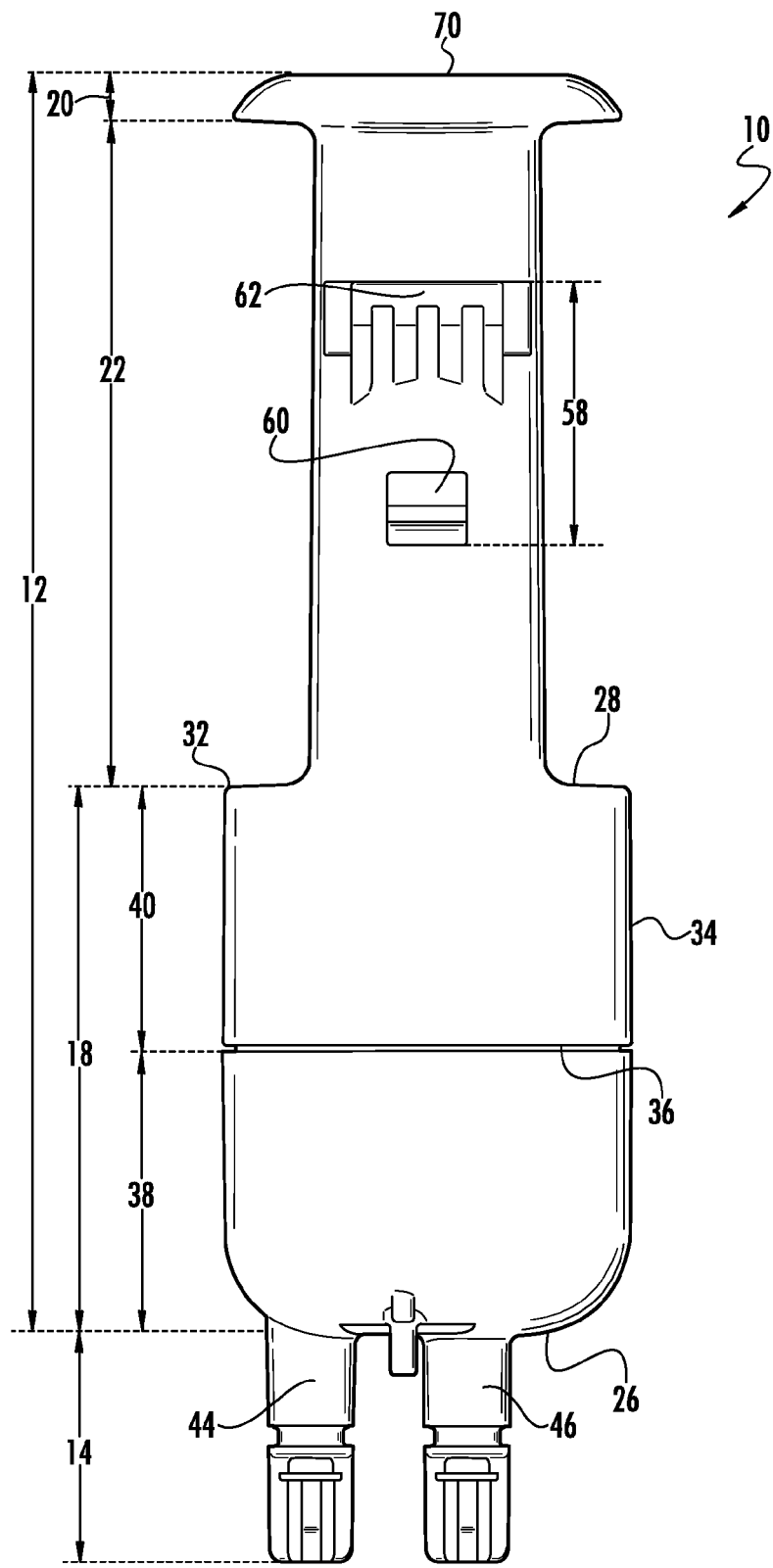
FIG. 7 is a side view of a fluid treatment apparatus according to an embodiment of the present invention.
Figure 8:
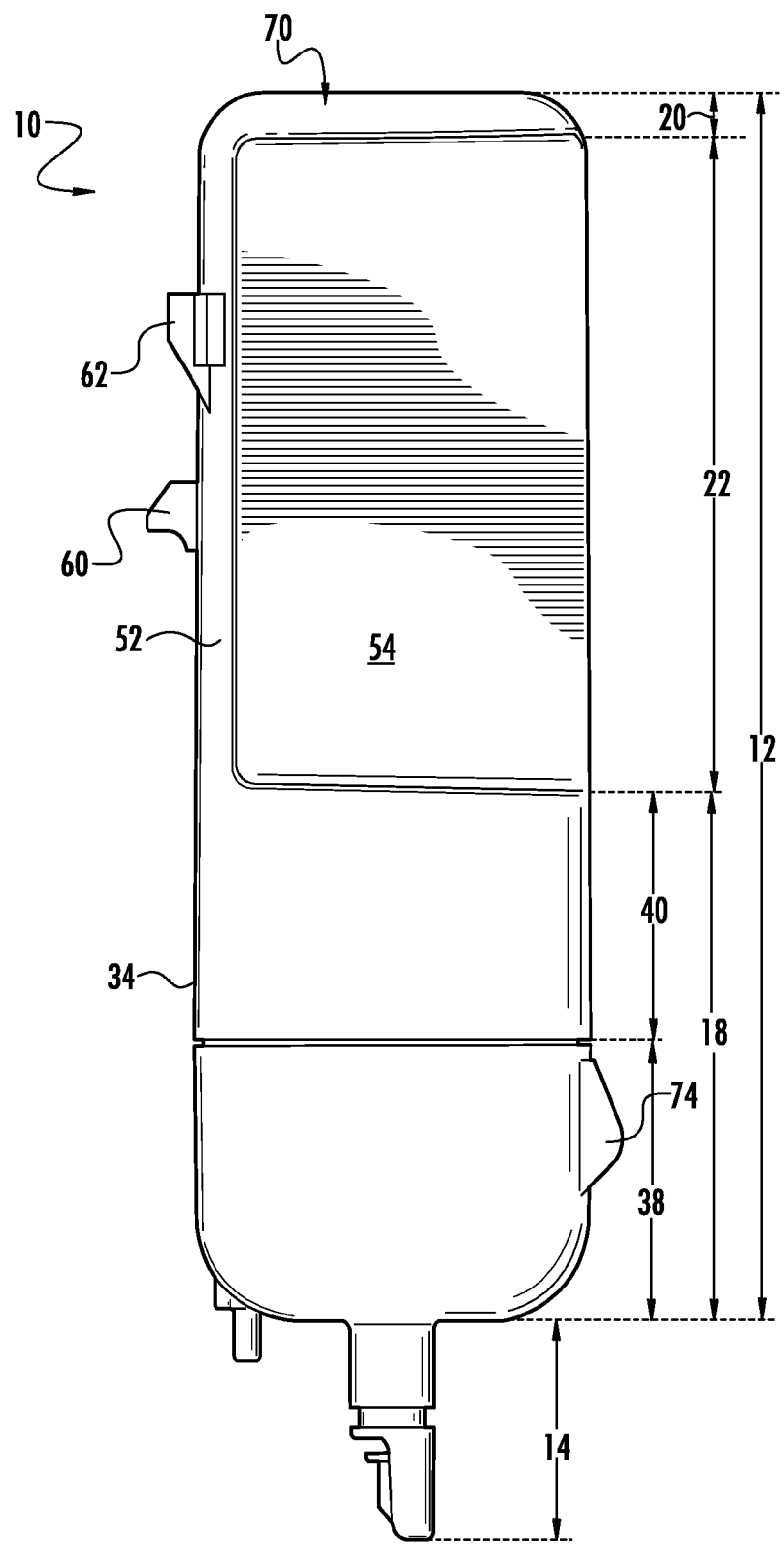
FIG. 8 is an alternative side view of a fluid treatment apparatus according to an embodiment of the present invention.

Referring now to FIGS. 3-9, the reference numeral 10 generally designates one embodiment of a fluid treatment apparatus for an appliance. The fluid treatment apparatus 10 typically includes: an elongated filter housing 12, a fluid connector system 14, and a fluid treatment medium or media 16 (FIG. 6). The filter housing 12 generally has a base portion 18, a cap 20, and an elongated support portion 22 extending longitudinally between the cap 20 and the base portion 18. A medium or media 16 is typically spaced within a fluid treatment media receiving volume 24, defined within the base portion 18.

The base portion 18 typically has a generally cylindrical shape, a first end 26, and a second end 28 opposite the first end 26 (FIG. 4). The first end 26 and second end 28 of the base portion 18 are generally circular shaped with equal circumference. A first end edge 30 and a second end edge 32 are defined by their respective circumferences and are located between the end surfaces and the cylindrical exterior surface 34 of the side of the base portion 18. The edges are typically rounded or radiused to form a substantially smooth or smooth and curved surface when transitioning between the end surfaces and the side exterior surface 34 of the base portion 18. In FIG. 4, the second end edge 32 is a less rounded edge than the first edge 30. The second end 28 and second end edge 32 may only be exposed in certain portions depending upon the location and shape of the elongated support portion 22. The base portion 18 could conceivably be shaped in various configurations, including a semi-spherical shape, a square prism shape, or another geometric configuration.

Figure 3A:
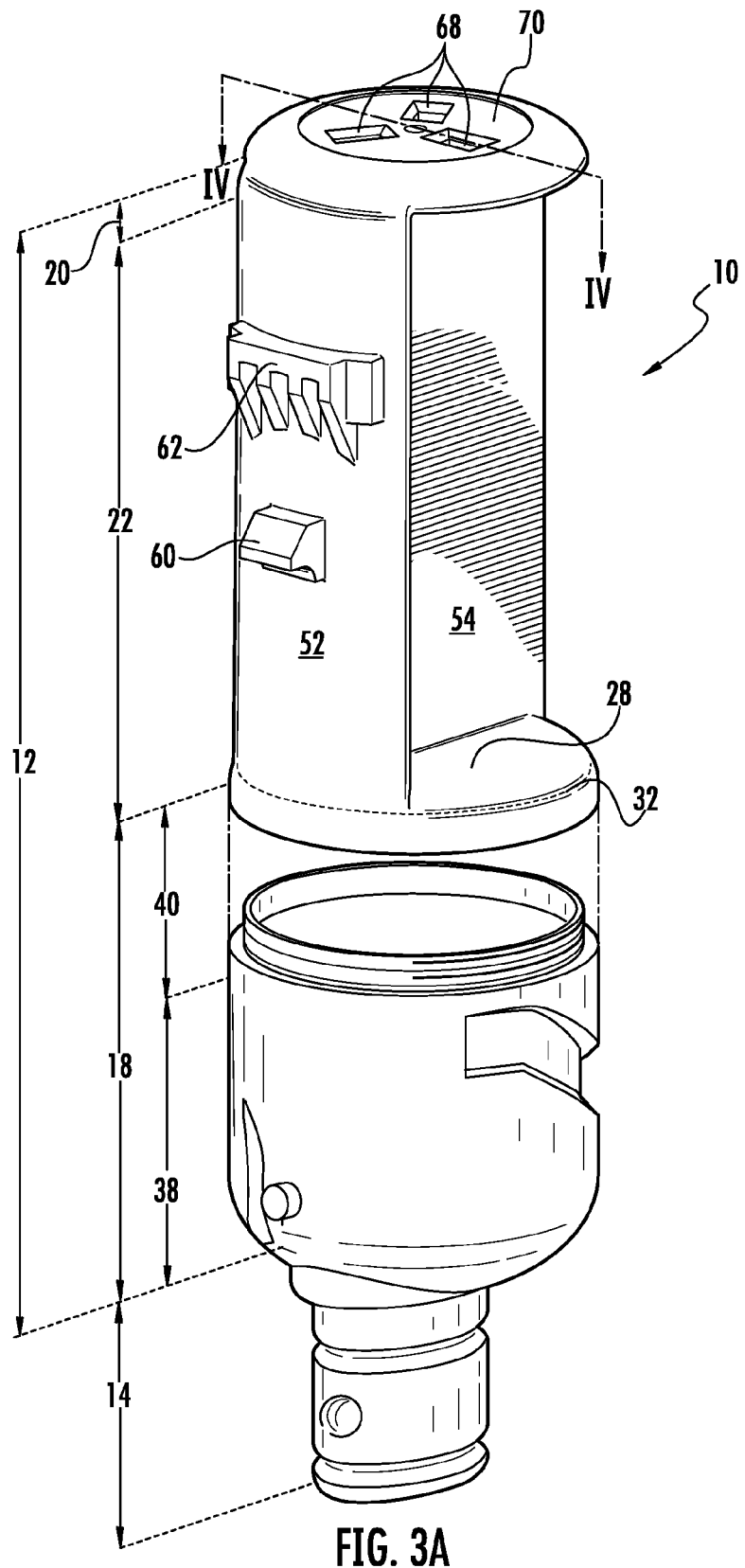
FIG. 3A is a perspective side view of an additional embodiment of the fluid treatment apparatus showing an elongated support portion detached.
Figure 4A:
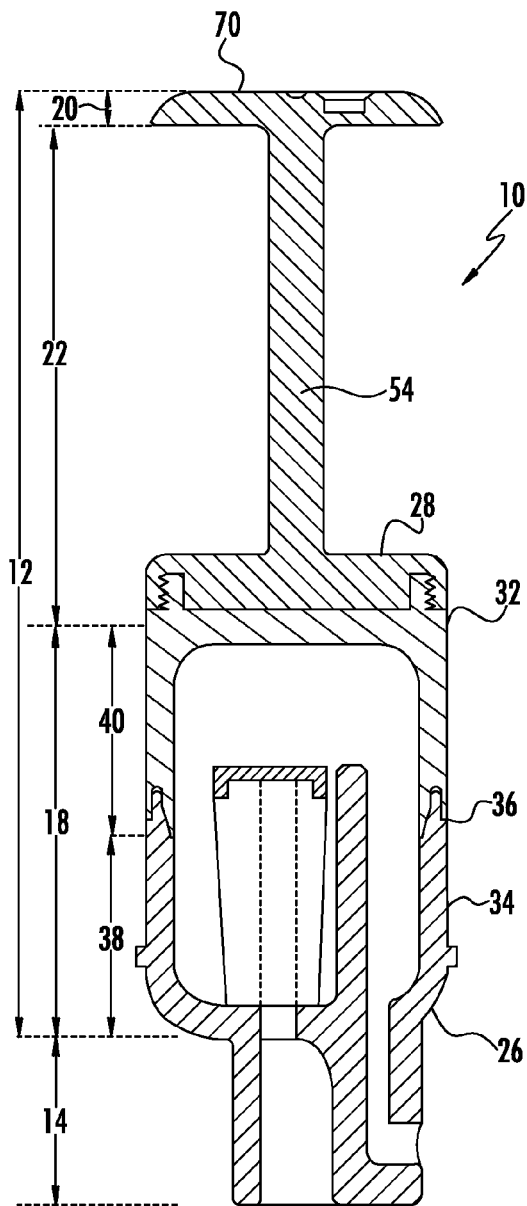
FIG. 4A is a side cross-sectional view of the additional embodiment of a fluid treatment apparatus taken along plane IV-IV of FIG. 3A.

An additional embodiment is illustrated in FIGS. 3A and 4A, showing, among other things, an alternatively shaped fluid connector system 14 configured to engage alternative appliance receiving apertures. In addition, the base portion 18 includes a helical groove and a pair of pegs extending laterally from the base portion 18 to engage such an alternative receiving aperture. It is conceivable that the fluid treatment apparatus may include other shapes or configurations of the fluid connector system 14 to engage an alternatively configured appliance.

The additional embodiment shown in FIGS. 3A and 4A also includes a threaded portion between the base portion 18 and the elongated support portion 22. As illustrated, the threaded portion may be positioned below the second end edge 32 of the base portion 18 and above the fluid treatment receiving volume 50 so as not to expose or interfere with the fluid treatment medium 16 therein. Also, upon threadably engaging the base portion 18 with the elongated support portion 22, the sidewall 52 of the elongated support portion 22 maintains a substantially smooth transition to the outer surface of the base portion 18, such that the base and elongated support portions 18, 22 maintain coaxially positioned to one another. As shown, the elongated support portion 22 may threadably engage and disengage the base portion 18 without the use of tools to allow the elongated support portion 22 to detachably couple with the base portion 18 or a replaceable base portion 18 that may include an alternative fluid treatment medium or other alternative characteristics. It is also conceivable that an alternative engagement mechanism from the illustrated threaded portion may be incorporated between the base portion 18 and the elongated support portion 22 to allow for detaching and replacing the base portion 18 without the use of tools.

Further, referring again to FIG. 3, a visible crease or joint 36 may be disposed at an intermediate portion about the side 34 of the base portion 18. This crease 36 is typically formed during the manufacturing process when media 16 is inserted or encased within the base portion 18 when the sections are engaged or sealed with one another. Specifically, the crease 36 is formed between two segments of the base portion 18, a first segment 38, typically a half, and a second segment 40, typically a half. The interior volume defined by the two segments when they engage one another define a filter media receiving volume 24 within the base portion 18 of the filter housing 12.

While a crease 36 is typically visible, a continuous, creaseless base portion may also be used. The base portion 18 is typically made of an extruded polymer, however, it is conceivable that a molded polymer, metal, or other generally rigid material could be used to form the base portion. The filter treatment media receiving volume 24 may also be integrally formed within the base portion 18, thereby forming the base portion 18 with filter treatment media 16 within the filter treatment media receiving volume 24 without a crease 36.

The base portion 18 has at least one, but more typically two or more apertures 42 that allow for fluid, typically water, to be received from an inlet 44 of the fluid connector system 14 to be transported into the fluid treatment media receiving volume 24 to interact with the media 16. Further, the apertures 42 allow for the fluid to leave the media 16 as filtered fluid (water) and exit the base portion aperture from an outlet 46 of the fluid connector system 14. The apertures 42 are arranged to accommodate flow rate and the intended use of the fluid treatment apparatus 10. The apertures 42, base portion 18, and filter housing 12 may be integrally formed with the fluid connector system 14 that engage the water supply port 202 and filtered water delivery port 204 of the filter head assembly 200 (see FIG. 10).

A fluid treatment medium or media 16 (see FIG. 6) typically has an effect on the liquid (water) flowing through it or otherwise coming into contact with it by adding and/or removing elements or compounds from the liquid (water), and is typically encased within or otherwise spaced within the base portion 18. The medium or media 16 may fill all of or a portion of the filter treatment media receiving volume 24. The media 16 is typically adapted for filtering contaminants, impurities, or microbiologies out of the liquid, typically water, but could, in addition or instead, add one or more functionality or a plurality of functionalities to the filtered water such as adding vitamins, minerals (i.e., fluoride) or other additives such as glucosamine, chondroitin, or other joint health enhancing compounds that are beneficial for consumption by animals, in particular, mammals, most typically humans. The media 16 has a top end 48 and a bottom end 50, wherein the bottom end 50 is adapted for receiving and dispensing liquid, typically water. The bottom end 50 is positioned near the first end 26 of the base portion 18. The top end 48 and the bottom end 50 of the media 16 may be a uniform medium not having distinguishing characteristics aside from its relative displacement within the fluid treatment media receiving volume 24. In one arrangement, liquid enters the bottom end 50 through an off-center aperture 42a connected to an inlet 44 in the first end 26 and travels to the top end 48 of the media 16. The liquid then traverses toward a more centrally located aperture 42b connected to an outlet 46 in the bottom end 50, generally flowing through the media 16, thereby allowing the medium or media to treat the liquid. Feasibly, the liquid flows perpendicularly through the media 16, axially or radially depending upon the interior layout of the media.

The media 16 may be divided into layers or other arrangements that provide different filtering properties and are comprised of varying materials. Water filtering materials may include, but are not limited to, one or a combination of carbon (e.g., activated carbon particles, such as mesoporous activated carbon, carbon powder, particles sintered with a plastic binder, carbon particles coated with a silver containing material, or a block of porous carbon), ion exchange material (e.g., resin beads, flat filtration membranes, fibrous filtration structures, etc.), zeolite particles or coatings (e.g., silver loaded), polyethylene, or charged-modified melt-blown or microfiber glass webs, alumina, diatomaceous earth, etc.

As discussed previously, the filter media may also add elements or compounds to the fluid such as vitamins, minerals, and nutritive components for mammalian (human) health. For example, after elements have been removed from the intake water or other fluid, fluoride may be introduced or reintroduced, if previously removed, to provide health benefits/protection to the consumer's teeth. It may also be beneficial to add nutrients beneficial components such as vitamins, minerals, and joint health ingredients (i.e., glucosamine and chondroitin) in particular amounts for a particular period of time. For example, newborns 0-3 months or children of various ages having particular nutritional needs may have specifically tailored nutrients introduced or reintroduced into the filtered water prior to consumption. The smaller filter capacity allows for targeted and selected nutrients to be added to the water for a particular purpose, person's age, and person's nutrient need. The smaller filter capacity is better suited for this type of timing/need based water treatment options.

The media 16, in addition to filtering particulate matter or impurities from the water and/or adding nutrients to the water, may instead add descaling agents or other cleaning agents to the water that function to clean the inner piping of the appliance 100 of particulates, biofilm, and salts such as calcium deposits. More specifically, biofilm comprises a polymeric conglomeration generally composed of extracellular DNA, proteins, and polysaccharides that may contain different types of microorganisms, (e.g. bacteria, archaea, protozoa, fungi and algae). The particulate(s), biofilm, and salts in the liquid conduits of the appliance 100 restrict water flow and/or add impurities to the previously filtered water prior to the water being consumed by the user. When such systems are used, the water passes through the filter, is treated to add the descaling or other cleaning agents, and the water delivered to the dispenser thereby at least partially, if not substantially, or fully, cleaning the fluid line portion extending after the filter location of particulate(s), biofilm, and salt that may alter the composition of the water being delivered to the consumer when a non-cleaning filter is engaged with the water system of the appliance.

The media 16 may be constructed for treating varying volumes of water, depending upon the type and purpose of the media 16. More specifically, media that is primarily used for filtering purpose is typically constructed for filtering 10-30 gallons of liquid, which is normally recommended for use over a 30 to 60 day period. Alternatively, media that is primarily used for cleaning or descaling purposes is typically constructed for treating 2-5 gallons of liquid.

The presently contemplated descaling agents include: organic acids, including but not limited to, sulfonic acids or carboxylic acids, in particular, lactic acid, acetic acid, formic acid, oxalic acid, uric acid solutions may be used alone or mixtures of such organic acids used. It is also possible to use inorganic acids such as phosphoric acid, hydrochloric acid, or sulfamic acid solutions, as well as mixtures of inorganic acid solutions. Mixtures of various inorganic and organic acids could also conceivably be used as descaling agents in accordance with embodiments of the present invention.

A fluid connector system 14 is typically coupled with the base portion 18 of the filter housing 12. Generally, the fluid connector system 14 employs an inlet 44 and an outlet 46, which are separate flow paths for receiving and dispensing a liquid flow, respectively. As discussed previously, the inlet 44 and outlet 46 are typically integrally connected with apertures 42 in the first end 26 of the base portion 18 and in fluid communication with the filter treatment media receiving volume 24 of the base portion 18. In one embodiment, the inlet 44 and outlet 46 are positioned in separate locations on the first end 26 to correspond to the locations of the apertures 42. Conceivably, one connector having an inlet portion and an outlet portion could be used. In such an arrangement, the water flow may be divided into two flow paths by a wall through the center or coaxially by a cylindrical wall that divides the water flow pathways.

In one embodiment, as illustrated in FIGS. 3-4, and 6-8, one inlet 44 and one outlet 46 separately employed; the inlet 44 is typically positioned at an off-center, radial side location, allowing the liquid to enter the fluid treatment media receiving volume 24 through an off-center aperture 42a at the radial side location, and also allowing the liquid to dispense from the fluid treatment media receiving volume 24 through a more centrally located aperture 42b and outlet 46 similarly positioned on the first end 26. Various arrangements of adapting the fluid connector system 14 to the filter housing 12 are contemplated, including a single connector that dispenses and receives liquid.

Referring again to FIG. 10, the filter head assembly 200 for receiving a water filter is located on or otherwise engaged with the appliance 100 and has a fluid treatment apparatus receiving cavity 206 and attachment ports 220 therein that are in fluid communication with the inlet 44 and outlet 46 when the filter treatment apparatus is operably engaged with the filter head assembly 200. The attachment ports 220 are typically a water supply port 202 and a filtered water and/or treated water delivery port 204 that is typically in fluid communication with a fluid dispenser and/or ice making apparatus. The fluid dispenser is typically located on an external surface, typically the door of the appliance. The fluid treatment apparatus receiving cavity 206 is generally defined by a cylindrical area, having a back portion 208, a front portion 210, and a length 218 extending between. The attachment ports are typically located at the back portion 208. An access door 212 may be hingedly coupled with the filter head assembly 200 to removably conceal the front portion 210, where the cap 20 is positioned when the fluid treatment apparatus 10 is inserted. At a mid-portion 209 of the fluid treatment apparatus receiving cavity 206, a receptor 214 is positioned for receiving a latch assembly 58. Further a guide groove 216, may be formed along the fluid treatment apparatus receiving cavity 206 to receive a notch 74 formed on a water filter, typically the base portion 18 of a fluid treatment assembly 10. The guide groove 216 may assist in rotating the fluid treatment apparatus 10 into the connecting (engaged) position 66 that allows fluid communication and flow between the filter head assembly 200 and the fluid treatment apparatus 10.

The elongated support portion 22 of the filter housing 12 longitudinally extends from the second end 28 of the base portion 18 and typically does not contain any fluid treatment media or medium 16 or come into contact with fluid flowing through or being treated by the fluid treatment apparatus 10. The elongated support portion 22 is typically a resilient structure capable of withstanding torsional (rotational) forces applied by the user to engage the fluid treatment apparatus 10 with the filter head assembly 200. The torsional forces may be applied to the cap 20 or directly to the elongated support portion 22. The elongated support portion 22 is uniquely constructed for strength without the use of excess and costly material.

The elongated support portion 22 typically includes at least one sidewall 52 and may also include one or more support walls 54. The sidewall 52 and support wall 54 extend longitudinally between the base portion 18 and the cap 20. The sidewall 52 is typically a circumferal extension of the base portion 18 and has a substantially circular segment cross-section. The support wall 54 is typically positioned substantially orthogonally (see FIG. 5) to the sidewall 52 interior facing surface 53, and it may be couple thereto or be integrally formed therewith.

Figure 5A:
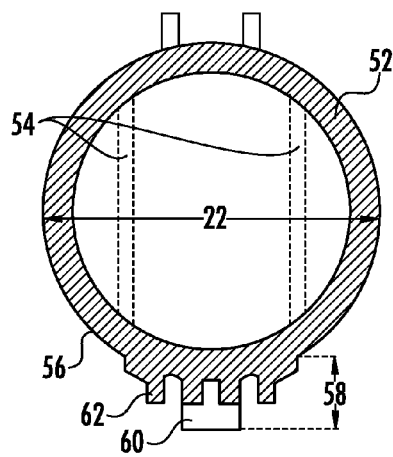
FIG. 5A is a top cross-sectional view of an alternative embodiment of an elongated support portion of the fluid treatment apparatus according to an embodiment of the present invention taken along plane V-V of FIG. 3.
Figure 5B:
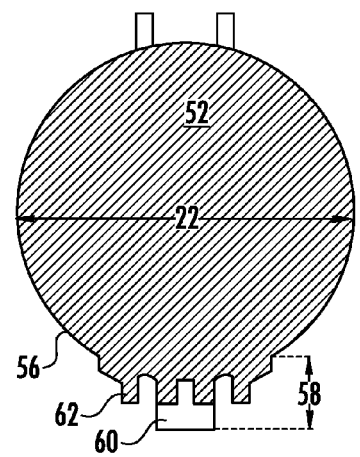
FIG. 5B is a top cross-sectional view of an alternative embodiment of the fluid treatment apparatus according to an embodiment of the present invention taken along plane V-V of FIG. 3.
Figure 5C:
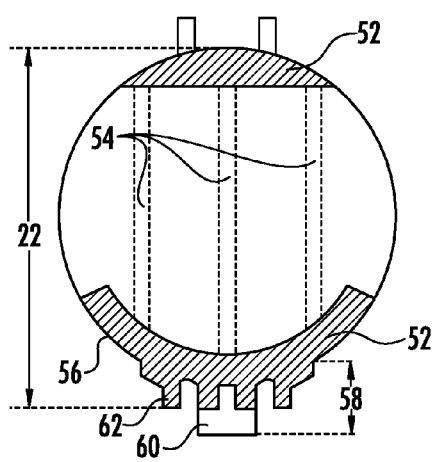
FIG. 5C is a top cross-sectional view of an alternative embodiment of the fluid treatment apparatus according to an embodiment of the present invention taken along plane V-V of FIG. 3.
Figure 5D:
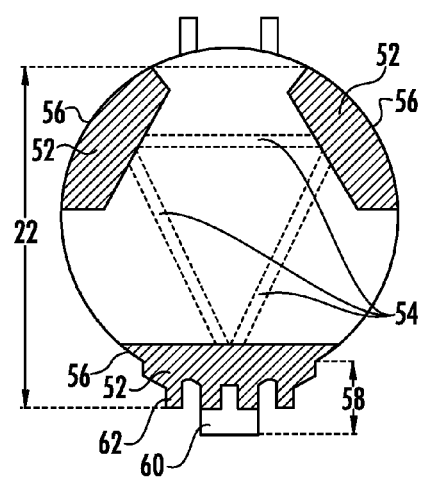
FIG. 5D is a top cross-sectional view of an alternative embodiment of the fluid treatment apparatus according to an embodiment of the present invention taken along plane V-V of FIG. 3.

With regard to the configurations that the support wall may embody, for example in the embodiment illustrated in FIG. 5A, the sidewall may extend around a majority or the entire circumference of the base portion 18, forming a hollow tube-shaped elongation having a generally equal outer diameter to the base portion 18. There may also be more than one sidewall 52 and/or more than one support wall 54 extending between the cap 20 and the base portion 18. In one alternative embodiment, as illustrated in FIG. 5C, the elongated support portion 22 has two sidewalls 52 having exterior surfaces 56 substantially aligned with the exterior surface 34 of the side of the base portion 18. In this embodiment, one or more support walls 54 may be positioned at various locations, extending between the two sidewalls 52. Further, in another embodiment, as illustrated in FIG. 5D, the elongated support portion 22 may have three sidewalls 52 having exterior surfaces 56 substantially aligned with the exterior surface 34 of the side of the base portion 18. In fact, the entire elongated support portion 22 could be a solid material, as shown in FIG. 5B, with substantially the same cross-section as the base portion. However, typically, the configuration shown in the FIG. 5 of this application is used to avoid using excess materials in the construction of the filter housing 12 while maintaining a latch assembly 58 location and the required torsional strength needed to allow the user to twist the filter housing 12 into a connected/engaged position 66 for receiving the liquid, such as water, from the appliance or other water source.

In the embodiment shown in FIG. 5, the cross section of the sidewall 52 typically has an arcuate exterior surface 56 substantially aligned with the second end edge 32 of the base portion 18. As illustrated in FIG. 5, the sidewall 52 also typically has an interior facing surface 53, defined by the chord 55 of the substantially circular cross section. The chord 55 may be the diameter of the circle as well as a length less than the chord 55 illustrated in FIG. 5. The interior facing surface 53 may be coupled to the support wall 52 or be integrally formed therewith. Any portion of the elongated support portion 22 may also be integrally formed with the base portion 18 or the cap 20. There may also be more than one sidewall 52 and/or more than one support wall 54 extending between the cap 20 and the base portion 18.

The elongated support portion 22, as illustrated in FIG. 5, also includes a support wall 54 longitudinally extended between the second end 28 of the base portion 18 and the cap 20 where the support wall 54 is positioned substantially orthogonally to the sidewall 52 interior facing surface 53, and it may be coupled thereto or be integrally formed therewith. The support wall 54 typically extends from the second end 28 on the base portion 18 and has a thickness 64 selected from a range between about 2 mm to about 6 mm, preferably about 4 mm when utilizing one support wall, as in FIG. 5. However, the support wall may have a varying thickness 64 throughout its length or width, such as a larger thickness provided near its connection to the sidewall 52 and a smaller thickness near the circumference of the base portion 18 (see FIG. 5).

In one embodiment, the support wall 54 and the sidewall 52 are substantially formed as one unitary piece. The unitary piece would typically be constructed of the same material as the remainder of the filter housing 12, but conceivably could be a different material. A primary function of the support wall 54 is to provide a substantially rigid connection between the cap 20 and the base portion 18, allowing the cap 20 to be accessed and engaged by a user for manipulating, removing, or installing the base portion 18 in a filter head assembly 200. Again, typically, the configuration shown in FIG. 5 of this application is used to avoid using excess materials, such as polymers, in the construction of the filter housing 12 while maintaining the latch assembly 58 location and the required torsional strength needed to allow the user to twist the filter housing 12 into a connected/engaged position 66 for receiving the fluid, such as water from the appliance or other water source. Typically the elongated support portion uses a substantially planar structure that extends across the filter treatment apparatus' cross sectional or across at least half of the filter treatment apparatus' cross-sectional length from the center of the cross section extending outwardly in a single direction and typically extending longitudinally between the base portion 18 and the cap 20.

The elongated support portion 22 also typically includes a latch assembly 58 radially extending from an intermediate portion along the sidewall 52. However, the latch assembly 58 may be located at various locations on the sidewall 52. The latch assembly 58 is adapted for detachably engaging the domestic refrigerator appliance 100. Specifically, the latch assembly 58 may engage a receptor 214, such as an inlet, a switch, or detection device within the filter head assembly 200 (FIG. 10) of the appliance 100. The receptor 214 generally mechanically retains and supports the fluid treatment apparatus in addition to optionally communicating with a control system of the appliance that the filter is present. The latch assembly 58 typically includes several components, including a fin-shaped member 60 and a notched member 62. The components of the latch assembly are generally adapted to allow the appliance 100 to detect the presence of the fluid treatment apparatus 10, to allow the appliance 100 to make a connection with the fluid treatment apparatus 10, and to allow the appliance 100 to detect the capacity, type, status, and quality of the fluid treatment apparatus 10. Examples of such connection mechanisms include a DIP switch arrangement, a magnetic retention arrangement, a reed switch arrangement, and an RFID (radio frequency identification) arrangement. The latch assembly 58 positioned along the sidewall 52 allows the fluid treatment apparatus 10 having a reduced capacity to be used in connection with current appliance models, such as the domestic refrigeration appliance 100 referenced herein, that are typically constructed to receive only larger capacity filter housings/assemblies with traditional capacities where the entirety of the length of the filter housing contains media for removing contaminants from water.

Figure 9:
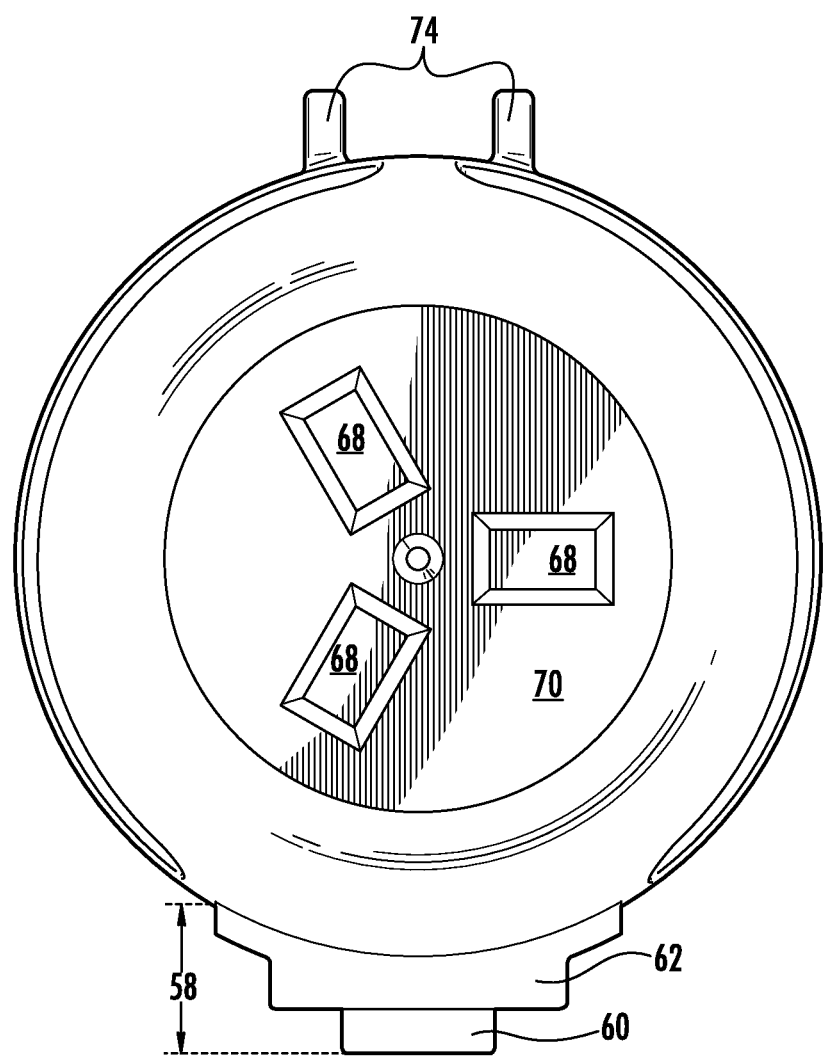
FIG. 9 is a top view of a fluid treatment apparatus according to an embodiment of the present invention.

The filter housing 12 also typically includes the cap 20, typically having a disk shape and orthogonally coupled to the support wall 54, as shown in FIGS. 3 and 9, for example. The cap 20 also typically has a circumference generally equal to the circumference of the base portion 18. The cap 20 may have a plurality of indented cavities 68 formed on its top surface 70, wherein the cavities 68 are radially arranged in a spoke-like fashion (see FIG. 9). These cavities 68 may function as a location to secure the fluid treatment apparatus 10 during its manufacturing process and when a user grasps the cap 20 for manipulation, removal, or installation in the appliance 100. Conceivably, a key (not shown) or other device could be adapted to engage the plurality of cavities 68, providing additional support for the user to manipulate, twist, remove, or install the fluid treatment apparatus 10. The top surface 70 of the cap 20 may also include an arrow 72, arrows, or other indication (see FIG. 10), showing the direction in which the user must position the filter housing 12 to place it in the connecting position 66, allowing it to engage with the filter head assembly 200 of the appliance 100.

The method for treating a liquid, typically water, using a fluid treatment apparatus 10 in an appliance 100 typically includes, exposing a fluid treatment apparatus receiving cavity 206 on a filter head assembly 200 (FIG. 10) of the appliance 100. The user may expose and access the receiving cavity 206 by opening the access door 212 hingedly coupled with the filter head assembly 200, or unscrewing an access cap or other closure concealing a fluid treatment apparatus receiving cavity.

Next, the user may grasp the fluid treatment apparatus 10 having a longitudinal length, as described above. The user then inserts the fluid treatment apparatus 10 into the receiving cavity 206 in a coaxial manner. When inserting the fluid treatment apparatus 10, the user may align it in a connecting position 66 with the filter head assembly, wherein the fluid connector system 14 of the base portion 18 of the fluid treatment apparatus 10 is manipulated and aligned by axially rotating the cap 20 or the elongated support portion 22. The connecting position 66 may be indicated to the user by the arrow 72, arrows, or other indication on the cap 20 of the fluid treatment apparatus 10.

Next, a latch assembly 58 extending from the exterior facing surface of the sidewall 52 of the fluid treatment apparatus 10 may detachably engage the filter head assembly 200. The latch assembly 58 engages with a receptor 214 in the tubular receiving cavity 206 when the fluid connector system 14 mates with the attachment ports 220, a water supply port 202, and a water delivery port 204. The latch assembly may engage a receptor 214 that is a switch or a detection device within the filter head assembly 200 to communicate with a control system of the appliance that the fluid treatment apparatus 10 is present. The latch assembly 58 may engage using various components, including a fin-shaped member 60 and a notched member 62. The components of the latch assembly are generally adapted to allow the appliance 100 to detect the presence of the fluid treatment apparatus 10, to allow the appliance 100 to make a connection with the fluid treatment apparatus 10, and to allow the appliance 100 to detect the capacity, type, status, and quality of the fluid treatment apparatus 10.

Next, either before, simultaneously, or closely after a latch assembly 58 engages a filter head assembly 200, the fluid treatment apparatus 10 sealably engages the water supply port 202 and the water delivery port 204 of the filter head assembly 200 by rotating the cap 20 or the elongated support portion 22 of the fluid treatment apparatus 10. Engaging the fluid treatment apparatus 10 opens a bypass valve in the filter head assembly 200 supplying a water flow from the appliance through the inlet 44 and into the medium or media, wherein the water flow is treated and thereafter dispensed through the outlet 46 back into the appliance 100. The tubular receiving cavity 206 may be adapted to receive and mechanically align the filter housing 12, typically using a guide groove 216 and a notch 74, to connect the fluid connector system 14 with the attachment ports 220 of the appliance 100.

When the filter housing 12 is fully inserted into the tubular receiving cavity 206 the base portion 18 typically occupies less than half the length 218 of the tubular receiving cavity 206, more typically about one-third to one-quarter of the tubular receiving cavity 206 proximate the attachment ports 220, and the elongated support portion 22 substantially occupies the remaining length 218 of the tubular receiving cavity 206 not occupied by the base portion 18. Upon complete sealing engagement with the filter housing 12 the appliance 100 may supply a water flow through the attachment port 220 and the fluid connector system 14 into contact with fluid treatment media 16. Within the fluid treatment media 16 the water flow is filtered and/or treated as described previously and thereafter dispensed through the fluid connector system 14 back into the appliance 100 to, typically, be delivered to the appliance dispenser and/or ice making machine. Accordingly, the water flow is supplied to the medium or media 16 via the inlet 44 and returned to the appliance via the outlet 46.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releaseable in nature, unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A fluid treatment apparatus having a longitudinal length comprising:
a base portion having a length one half the longitudinal length of the fluid treatment apparatus or less, and having a first end, a second end, and at least one side having an exterior surface and an interior surface and extending between the first and second end, defining a fluid treatment media receiving volume within the base portion, wherein the first end has an inlet and an outlet for receiving and dispensing a fluid, respectively, to and from the fluid treatment media receiving volume;
a medium or media spaced within the fluid treatment receiving volume, wherein the medium or media treats a fluid contacting the medium or media; and
an elongated support portion engaged with the base portion and having a length one half the longitudinal length of the fluid treatment apparatus or more comprising:
a cap; and
a sidewall extending longitudinally between the second end of the base portion and the cap, wherein the sidewall has an exterior facing surface that is an extension of and at least substantially aligned with the exterior surface of the side of the base portion; wherein the elongated support portion further comprises:
a strengthening support wall longitudinally extending between the second end of the base portion and the cap; the strengthening support wall having a portion extending generally perpendicular to the sidewall of the elongated support portion and having a portion being coaxial with the base portion.

2. The fluid treatment apparatus of claim 1, wherein the elongated support portion further comprises:
a latch assembly extending from the exterior facing surface of the sidewall, wherein the latch assembly detachably engages a receptor within a filter head assembly of an appliance.

3. The fluid treatment apparatus of claim 2, wherein the latch assembly engages a section of the filter head assembly and the filter head assembly detects the presence and a capacity of the fluid treatment apparatus when the fluid treatment apparatus is engaged with a filter head assembly.

4. The fluid treatment apparatus of claim 1, wherein base portion is cylindrical shaped and the side is tubular shaped, and wherein the support wall engages an interior facing surface of the sidewall and extends across a portion or all of a diameter of the base portion.

5. The fluid treatment apparatus of claim 1, wherein the base portion comprises less than 40 percent of the longitudinal length of the fluid treatment apparatus.

6. The fluid treatment apparatus of claim 1, wherein the medium or media adds a descaling agent to the fluid, chosen from the group consisting of sulfonic acid, carboxylic acid, lactic acid, acetic acid, formic acid, oxalic acid, uric acid, phosphoric acid, hydrochloric acid, sulfamic acid, and mixtures thereof.

7. The fluid treatment apparatus of claim 1, wherein the medium or media is chosen from the group consisting of: activated carbon particles, a carbon powder, a vitamin treatment material, aluminosilicate material, an organic acid, inorganic acid, particles sintered with a plastic binder, carbon particles coated with a silver material, a block of porous carbon, an ion exchange material, resin beads, flat filtration membranes, fibrous filtration structures, zeolite particles, zeolite coatings, alumina, diatomaceous earth, polyethylene, charged-modified webs, melt-blown webs, and microfiber glass.

8. A water treatment apparatus, having a longitudinal length, that engages an appliance and receives water to be treated by the water treatment apparatus from the appliance comprising:
a cylindrical shaped base portion having a length one half the longitudinal length of the water treatment apparatus or less having a first end, a second end, a tubular shaped side with an exterior surface and an interior surface extending between the first and second end, wherein the first end, second end, and side define an interior water receiving volume within the base portion, and wherein the first end has an inlet and an outlet for receiving and dispensing water, respectively;
a medium or media spaced within the water receiving volume, wherein the medium or media engages water received through the inlet into the water receiving volume and treats the water contacting the medium or media to form treated water that is dispensed through the outlet; and
an elongated support portion devoid of any medium or media and does not contact the water received by the inlet, including:
a cap;
a sidewall extending from the second end of the base portion, wherein the sidewall has an exterior facing surface that is aligned with or substantially aligned with the exterior surface of the tubular side of the base portion; wherein the elongated support portion further comprises:
a strengthening support wall longitudinally extending between the second end of the base portion and the cap; the strengthening support wall having a portion extending generally perpendicular to the sidewall of the elongated support portion and having a portion being coaxial with the base portion.

9. The water treatment apparatus of claim 8, wherein the elongated support portion further comprises:
a latch assembly extending from the exterior facing surface of the sidewall, wherein the latch assembly detachably engages with a filter head assembly of the appliance.

10. The water treatment apparatus of claim 9, wherein the latch assembly engages a mechanical switch within the filter head assembly of the appliance and communicates the presence and a capacity of the water treatment apparatus to a controller or microprocessor when the water treatment apparatus is engaged with the filter head assembly.

11. The water treatment apparatus of claim 8, wherein the sidewall has a planar interior facing surface defined by a chord across a substantially circular cross section of the base portion.

12. The water treatment apparatus of claim 8, wherein the sidewall has a thickness selected from a range been 3 mm and 6 mm and the base portion comprises less than 40 percent of the total longitudinal length of the water treatment apparatus.

13. The water treatment apparatus of claim 8, wherein the medium or media treats the water flow by a treatment or treatments chosen from the group consisting of:
filtering particulate matter from the water flow, adding a descaling agent to the water flow, and adding vitamins, minerals, or other health enhancing additives; purifying the taste, odor and color of the water or mixtures thereof.

14. The water treatment apparatus of claim 8, wherein the sidewall has an interior facing surface and the sidewall extends around the circumference of the second end of the base portion.

15. The water treatment apparatus of claim 8, wherein the elongated support portion further comprises a cap and two sidewalls engaged with the second end of the base portion end extending between the second end of the base portion and the cap, wherein the sidewalls each have an interior facing surface and an exterior facing surface wherein the exterior facing surface of the sidewalls are aligned with or substantially aligned with the exterior surface of the tubular side of the base portion.

16. The water treatment apparatus of claim 15, wherein the elongated support portion further comprises at least one support wall engaged with the interior facing surface of the sidewall and extending between the second end of the base portion and the cap.

17. The water treatment apparatus of claim 8, wherein the elongated support portion further comprises a support wall engaged with the second end of the base portion and an interior facing surface of the sidewall and extending longitudinally from the second end of the base portion, and wherein the support wall substantially orthogonally engages the interior facing surface of the sidewall.

18. The water treatment apparatus of claim 17, wherein the elongated support portion further comprises a cap engaged with a distal end of the sidewall and support wall.

\* \* \* \* \*